United States Patent
Samouei et al.

(10) Patent No.: US 11,492,710 B2
(45) Date of Patent: Nov. 8, 2022

(54) TRIFUNCTIONAL AMINE BASED CORROSION INHIBITOR COMPOSITIONS

(71) Applicant: Ascend Performance Materials Operations LLC, Houston, TX (US)

(72) Inventors: Hamidreza Samouei, College Station, TX (US); Salar Afra, College Station, TX (US); Hisham Nasr-El-Din, College Station, TX (US); Zheng Chai, Houston, TX (US); Jefferson Thomas Ebert, Houston, TX (US); Benjamin Haseltine, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 0 days.

(21) Appl. No.: 17/097,075

(22) Filed: Nov. 13, 2020

(65) Prior Publication Data
US 2021/0147984 A1 May 20, 2021

Related U.S. Application Data

(60) Provisional application No. 62/936,965, filed on Nov. 18, 2019.

(51) Int. Cl.
C23F 11/12 (2006.01)
C23F 11/14 (2006.01)

(52) U.S. Cl.
CPC .......... *C23F 11/126* (2013.01); *C23F 11/141* (2013.01)

(58) Field of Classification Search
CPC ......... C23F 11/04; C23F 11/12; C23F 11/124; C23F 11/126; C23F 11/14; C23F 11/141; C23F 11/147; C09K 8/54

USPC .... 252/387, 390, 392, 394, 396; 422/12, 13, 422/14, 16, 17; 510/264
See application file for complete search history.

(56) References Cited

U.S. PATENT DOCUMENTS

| | | | | |
|---|---|---|---|---|
| 4,010,111 A | * | 3/1977 | Chappell | C23F 11/10 252/391 |
| 4,028,055 A | | 6/1977 | Doi et al. | |
| 4,073,618 A | * | 2/1978 | Doi | C23F 11/04 252/390 |
| 4,614,600 A | * | 9/1986 | Schilling | C09K 8/54 252/391 |
| 6,475,431 B1 | * | 11/2002 | Naraghi | C23F 11/144 252/394 |

(Continued)

FOREIGN PATENT DOCUMENTS

| | | | | |
|---|---|---|---|---|
| CA | 2249171 A1 | * | 4/1999 | ............ C23F 11/145 |
| CN | 105714302 A | | 6/2016 | |

(Continued)

OTHER PUBLICATIONS

English language machine translation of DE 19520269 A1 (Year: 1996).*

*Primary Examiner* — Matthew R Diaz
(74) *Attorney, Agent, or Firm* — Cozen O'Connor

(57) ABSTRACT

Corrosion inhibitor compositions for reducing the corrosive effect of acidic environments on metallic substrates are provided herein. In particular, the present disclosure describes corrosion inhibitor compositions comprising a condensation product of a trifunctional amine and a fatty acid. The present disclosure also describes methods of preparing and of using such corrosion inhibitor compositions.

17 Claims, 1 Drawing Sheet

(56) References Cited

U.S. PATENT DOCUMENTS

2009/0181867 A1* 7/2009 Yang ..................... C23F 11/10
  507/243
2017/0247798 A1* 8/2017 Moloney ................ C23F 11/04
2017/0342310 A1   11/2017 Obeyesekere et al.

FOREIGN PATENT DOCUMENTS

| CN | 106283069 | A |   | 1/2017 | |
|----|-----------|---|---|--------|---|
| DE | 19520269  | A1 | * | 12/1996 | ............. C23F 11/14 |
| EP | 0906969   | A1 | * | 4/1999 | ............ C23F 11/145 |
| EP | 0906969   | A1 |   | 4/1999 | |
| GB | 809001    | A  | * | 2/1959 | ............ C23F 11/143 |

* cited by examiner

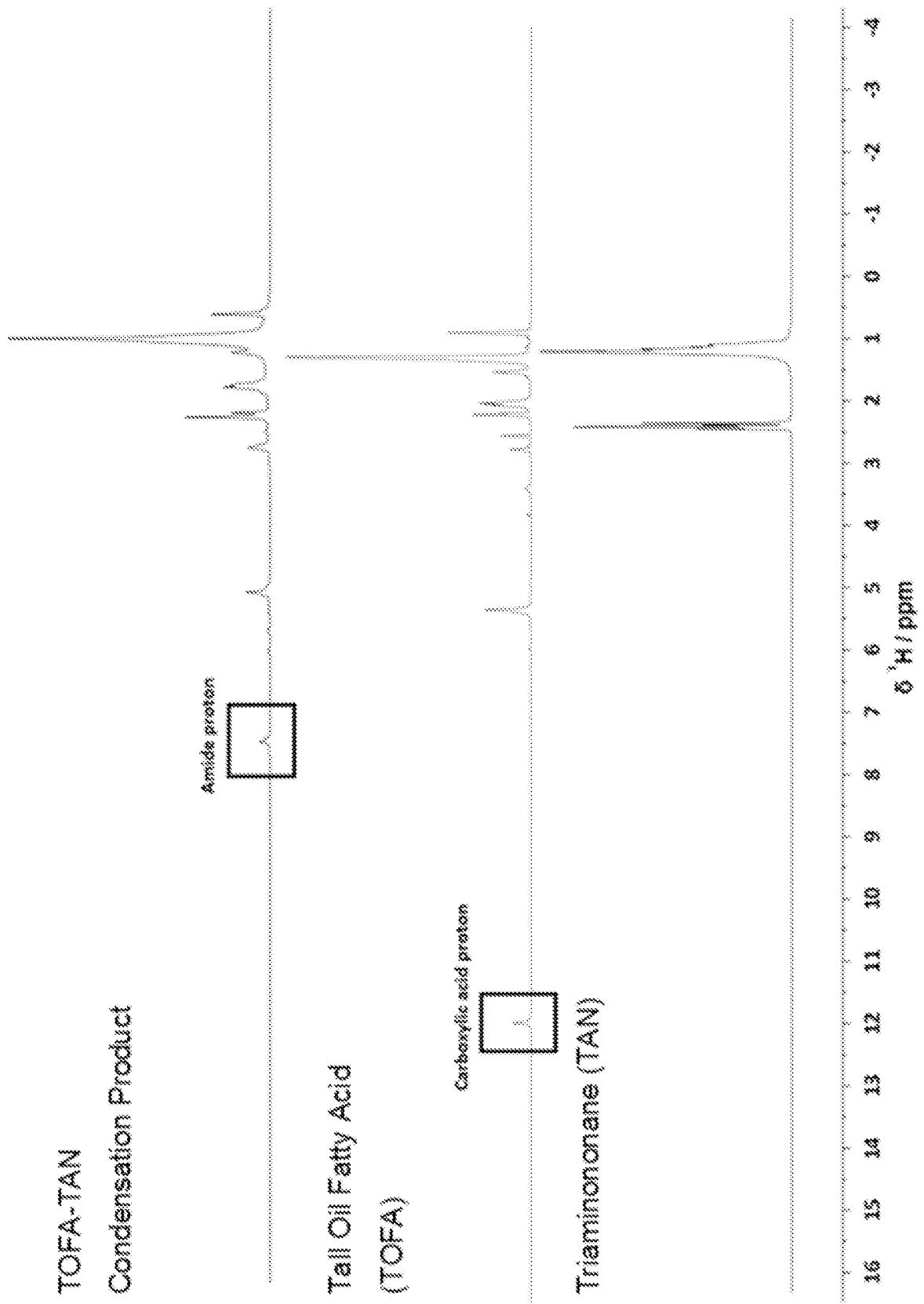

TRIFUNCTIONAL AMINE BASED CORROSION INHIBITOR COMPOSITIONS

PRIORITY

This application claims priority to U.S. Provisional Application No. 62/936,965, filed on Nov. 18, 2019, which is incorporated herein by reference.

FIELD

The present disclosure relates generally corrosion inhibitor compositions, processes for preparing corrosion inhibitor compositions, and methods for inhibiting corrosion of metallic substrates. As described herein, the corrosion inhibitor compositions reduce the rate of corrosion of metal substrates (in acidic environments).

BACKGROUND

Production equipment used in various technologies, such as piping, pumps, and motors, is typically made of metals and metal alloys and requires maintenance to continue to function properly. In the course of operation, this equipment may often be exposed acidic or otherwise corrosive environments, especially in oil and gas operations. Exposure to acidic environments gradually wears away and destroys metallic surfaces, which ultimately can cause them to fail.

To mitigate corrosion issues, inhibitors are often used. Conventional corrosion inhibitors include surfactants, such as condensation products of fatty acids and diethylene triamine (DETA). Broadly, conventional corrosion inhibitors operate by forming a protective layer on a metal substrate. The protective layer physically prevents corrosive chemicals, such as acids, from penetrating the metal surface. These conventional corrosion inhibitors, however, have been found to suffer from performance problems, especially when utilized at higher temperatures and/or acidic environments. In addition, as better performing inhibitors are investigated, efficiency challenges have arisen, e.g., high detrimental side product production. Further, many conventional products and related production processes require the use of hazardous and environmentally-unfriendly reagents, e.g., thionyl chloride.

Even in view of conventional technology, there exists a need for a corrosion inhibitor compositions that demonstrate improved anti-corrosive performance, even at elevated temperatures. Furthermore, there is a need for affordable, environmentally-friendly corrosion inhibitor compositions that do not require the use of hazardous reagents during their production.

SUMMARY

The present disclosure relates to a corrosion inhibitor composition, comprising a condensation product of a trifunctional amine and a fatty acid; wherein the weight ratio of the trifunctional amine to the fatty acid in the condensation product ranges from 0.1:1 to 10:1; and wherein the corrosion inhibitor composition demonstrates a corrosion rate less than 0.001 $lb/ft^2$ in 6 hours at 78° F. as tested in accordance with ASTM G31-12a (2017). In some aspects, the weight ratio of the trifunctional amine to the fatty acid in the condensation product is from 0.3:1 to 2:1. In some aspects, the corrosion inhibitor composition demonstrates a corrosion rate of less than 0.001 $lb/ft^2$ in 6 hours at 78° F. In some aspects, the corrosion inhibitor composition demonstrates a corrosion rate of less than 0.1 $lb/ft^2$ in 6 h at 200° F. In some aspects, the corrosion inhibitor composition further comprising a metal halide/halide ion, optionally present in an amount ranging from 0.01 wt. % to 25 wt. %. In some of these aspects, the corrosion inhibitor composition demonstrates a corrosion rate of less than 0.05 $lb/ft^2$ in 6 h at 200° F. In some of these aspects, the corrosion inhibitor composition demonstrates a corrosion rate of less than 5 $lb/ft^2$ in 6 h at 300° F. In some aspects, the corrosion inhibitor composition further comprises an additional trifunctional amine, optionally present in an amount ranging from 0.01 wt. % to 25 wt. %. In some aspects, the corrosion inhibitor composition further comprises an additional fatty acid, optionally present in an amount ranging from 0.01 wt. % to 25 wt. %. In some aspects, the additional trifunctional amine is the same as the reactant trifunctional amine. In some aspects, the additional fatty acid amine is the same as the reactant fatty acid. In some aspects, the corrosion inhibitor composition further comprises a first additive comprising a metal halide/halide ion; a second additive comprising an additional trifunctional amine; and a third additive comprising an additional fatty acid. In some of these aspects, the corrosion inhibitor composition demonstrates a corrosion rate of less than 0.02 $lb/ft^2$ in 6 h at 200° F. In some aspects, the trifunctional amine comprises from 6 to 12 carbon atoms. In some aspects, the trifunctional amine has a chemical formula $C_xH_y(NH_2)_3$, wherein x is from 6 to 12; and wherein y is less than or equal to 23. In some aspects, the fatty acid comprises palmitic acid, oleic acid, linoleic acid, abietic acid, sapienic acid, palmitoleic acid, myristoleic acid, elaidic acid, vaccenic acid, or tall oil, isomers thereof, or combinations thereof. In some aspects, the halide/halide ion comprises lithium chloride, sodium chloride, potassium chloride, lithium bromide, sodium bromide, potassium bromide, lithium iodide, sodium iodide, or potassium iodide, or combinations thereof. In some aspects, the corrosion inhibitor composition is substantially free of formic acid.

The present disclosure also relates to a process for preparing corrosion inhibitor composition, comprising: reacting a trifunctional amine and a fatty acid at a temperature of at least 100° C. for at least 10 hours to form a condensation product; wherein the condensation product comprises less than 15 wt. % impurities. In some aspects, the method is substantially free of thionyl chloride.

The present disclosure also relates to a process for inhibiting corrosion of a metallic substrate, the method comprising: applying to the metallic substrate a corrosion inhibitor composition comprising a condensation product of a trifunctional amine and a fatty acid; wherein the weight ratio of the trifunctional amine to the fatty acid in the condensation product ranges from 0.1:1 to 10:1. In some aspects, the applying further comprises dispersing the corrosion inhibitor composition in an organic solvent. In some aspects, the organic solvent is an alcohol selected from the group consisting of ethanol, n-propanol, isopropanol, n-butanol, sec-butanol, isobutanol, t-butanol, amyl alcohol, and combinations thereof. In some aspects, the corrosion inhibitor composition further comprises: 0.01 to 25 wt. % a first additive comprising a metal halide/halide ion; 0.01 to 25 wt. % a second additive comprising an additional trifunctional amine; and/or 0.01 to 25 wt. % a third additive comprising an additional fatty acid.

BRIEF DESCRIPTION OF THE DRAWINGS

The present disclosure is described in detail below with reference to the appended drawings, wherein like numerals designate similar parts.

FIG. 1 shows $^1$NMR spectra of (a) a condensation product, (b) a fatty acid reagent, and (c) a trifunctional amine, according to an embodiment of the present disclosure.

DETAILED DESCRIPTION

Introduction

As noted above, conventional corrosion inhibitors include various surfactants, e.g., diethylene triamine. However, these inhibitors suffer from performance problems, especially at high temperatures. Further, the production of conventional inhibitors typically requires hazardous, environmentally-unfriendly reagents.

The inventors have now found that a condensation reaction of a trifunctional amine and a fatty acid yields a condensation product that demonstrates superior corrosion inhibition performance, e.g., a corrosion rate less than 0.001 lb/ft$^2$ in 6 hours at 78° F. Importantly, the inventors have found that, in some embodiments, the weight ratio of the trifunctional amine to the fatty acid may contribute to the corrosion inhibition properties of the resultant condensation product.

Beneficially, the disclosed condensation products may be formed using a production process that does not require complex synthesis pathways, which contributes to overall process simplicity and efficiency. Also, the production process avoids the need for environmentally-unfriendly reactants, which provides for additional process and safety benefits.

In some embodiments, the present disclosure relates to corrosion inhibitor compositions comprising a condensation product of a trifunctional amine and a fatty acid. The weight ratio of the trifunctional amine to the fatty acid in the condensation product may range from 0.1:1 to 10:1 (additional ranges and limits for this ratio are disclosed herein). In some embodiments, the condensation reaction may be conducted at the particular reaction conditions disclosed herein, e.g., at a temperature of at least 150° C. and/or for a reaction time of at least 10 hours. As noted above, the corrosion inhibitor compositions demonstrate a superior corrosion rate, e.g., less than 0.001 lb/ft$^2$ in 6 hours at 78° F. as tested in accordance with ASTM G31-12a. In some cases, the condensation product has a high purity, e.g., comprises less than 15 wt. % impurities.

Trifunctional Amine

The condensation product of the present disclosure is formed by reacting a trifunctional amine and a fatty acid. The trifunctional amine comprises an organic compound having at least three amino functional groups, e.g., three amino functional groups, four amino functional groups, five amino functional groups, six amino functional groups, or seven amino functional groups. In some embodiments of the corrosion inhibitor composition, the trifunctional amine comprises a combination of two or more such compounds.

Each amino functional group of the trifunctional amine may be subcategorized as a primary (or 1°) amine, a secondary (or 2°) amine, or tertiary (or 3°) amine. In some embodiments, the amino groups of the trifunctional amine may be of differing subcategories. In some embodiments, for example, the trifunctional amine may have a primary amino functional group, a secondary amino functional group, and a tertiary amino functional group. The trifunctional amino has at least one primary amino functional groups, e.g., at least two primary amino functional groups or at least three primary amino functional groups. Unlike amines used in conventional corrosion inhibitors, such as DETA, in some embodiments, all the amino functional groups of the trifunctional amine are primary.

As organic compounds, the trifunctional amine of the present disclosure necessarily comprises at least one carbon atoms. In some embodiments, the trifunctional amine comprises from 6 to 12 carbon atoms, e.g., from 6 to 11 carbon atoms, from 6 to 10 carbon atoms, from 7 to 12 carbon atoms, from 7 to 11 carbon atoms, from 7 to 10 carbon atoms, from 8 to 12 carbon atoms, from 8 to 11 carbon atoms, from 8 to 10 carbon atoms from 9 to 12 carbon atoms, from 9 to 11 carbon atoms, or from 9 to 10 carbon atoms. In terms of lower limits, the trifunctional amine may comprise at least 6 carbon atoms, e.g., at least 7 carbon atoms, at least 8 carbon atoms, or at least 9 carbon atoms. In terms of upper limits, the trifunctional amine may comprise less than 12 carbon atoms, e.g., less than 11 carbon atoms, or less than 10 carbon atoms.

The organic structure of the trifunctional amine is not particularly limited. In some embodiments, the trifunctional amine may be saturated. In other embodiments, the trifunctional amine may be unsaturated, e.g., an alkene or alkyne as the base hydrocarbon (base aliphatic chain). In some embodiments, the trifunctional amine may be mono-unsaturated or poly-unsaturated, e.g., as a cumulated diene, conjugated diene, or unconjugated diene. In some embodiments, the trifunctional amine may be comprise an open-chain compound, a straight-chain compound, a branched-chain compound, a cyclic compound, or a combination of these.

In some embodiments, the trifunctional amine of the present disclosure may have the following chemical formula:

In one embodiment, x in the chemical formula is from 6 to 12, e.g., from 6 to 11, from 6 to 10, from 7 to 12, from 7 to 11, from 7 to 10, from 8 to 12, from 8 to 11, from 8 to 10 from 9 to 12, from 9 to 11, or from 9 to 10. In terms of lower limits, x may be at least 6, e.g., at least 7, at least 8, or at least 9. In terms of upper limits, x may be less than 12, e.g., less than 11, or less than 10.

In one embodiment, y in the chemical formula is from 3 to 23, e.g., from 4 to 23, from 5 to 23, from 6 to 23, from 3 to 22, from 4 to 22, from 5 to 22, from 6 to 22, from 3 to 21, from 4 to 21, from 5 to 21, from 6 to 21, from 3 to 20, from 4 to 20, from 5 to 20, from 6 to 20, from 3 to 23, from 4 to 23, from 5 to 23, from 6 to 23, from 3 to 18, from 4 to 18, from 5 to 18, or from 6 to 18. In terms of upper limits, y may be 23 or less, e.g., 22 or less, 21 or less, 20 or less, 19 or less, or 18 or less. In terms of lower limits, y may be at least 3, e.g., at least 4, at least 5, or at least 6.

In the chemical formula, R' and R" each may be a hydrogen or an alkyl group of 1 to 6 carbon atoms. In some embodiments, R' and R" are different structure. In some embodiments, for example, R' is hydrogen and R" is an alkyl group of less than 6 carbon atoms, e.g., less than 5 carbon atoms, less than 4 carbon atoms, or less than 3 carbon atoms. In some embodiments, R' and R" are the same structure. In some embodiments, for example both R' and R" are hydrogen.

Examples of suitable trifunctional amines include, without limitation, triaminohexane, triaminoheptane, triaminooctane, triaminononane, triaminodecane, triaminoundecane, triaminododecane, triaminocyclohexane, triaminocycloheptane, triaminocyclooctane, triaminocyclononane, triaminocyclodecane, triaminocycloundecane, triaminocyclododecane, triaminohexene, triaminoheptene, triaminooctene, triaminononene, triaminodecene, triaminoundecene, triaminododecene, tetraaminohexane, tetraaminoheptane, tetraaminooctane, tetraaminononane, tetraaminodecane, tetraaminoundecane, tetraaminododecane, tetraaminocyclohexane, tetraaminocycloheptane, tetraaminocyclooctane, tetraaminocyclononane, tetraaminocyclodecane, tetraaminocycloundecane, tetraaminocyclododecane, tetraaminohexene, tetraaminoheptene, tetraaminooctene, tetraaminononene, tetraaminodecene, tetraaminoundecene, tetraaminododecene, or isomers thereof, or combinations thereof.

One example of a commercially available trifunctional amine suitable for the corrosion inhibitor composition is Hexatran™ by Ascend Performance Materials.

Fatty Acid

The condensation reaction also utilizes a fatty acid as a reactant. The fatty acid comprises an organic compound having both a carboxylic acid functional group (COOH) and an aliphatic chain. In some embodiments of the corrosion inhibitor composition, the fatty acid comprises a combination of two or more such compounds.

The fatty acid of the corrosion inhibitor composition is not particularly limited. In one embodiment, the fatty acid comprises from 8 to 24 carbon atoms, e.g., from 9 to 24 carbon atoms, from 10 to 24 carbon atoms, from 11 to 24 carbon atoms, from 12 to 24 carbon atoms, from 13 to 24 carbon atoms, from 14 to 24 carbon atoms, from 8 to 23 carbon atoms, from 9 to 23 carbon atoms, from 10 to 23 carbon atoms, from 11 to 23 carbon atoms, from 12 to 23 carbon atoms, from 13 to 23 carbon atoms, from 14 to 23 carbon atoms, from 8 to 22 carbon atoms, from 9 to 22 carbon atoms, from 10 to 22 carbon atoms, from 11 to 22 carbon atoms, from 12 to 22 carbon atoms, from 13 to 22 carbon atoms, from 14 to 22 carbon atoms, from 8 to 21 carbon atoms, from 9 to 21 carbon atoms, from 10 to 21 carbon atoms, from 11 to 21 carbon atoms, from 12 to 21 carbon atoms, from 13 to 21 carbon atoms, from 14 to 21 carbon atoms, from 8 to 20 carbon atoms, from 9 to 20 carbon atoms, from 10 to 20 carbon atoms, from 11 to 20 carbon atoms, from 12 to 20 carbon atoms, from 13 to 20 carbon atoms, or from 14 to 20 carbon atoms. In terms of lower limits, the fatty acid may comprise greater than 8 carbon atoms, e.g., greater than 9 carbon atoms, greater than 10 carbon atoms, greater than 11 carbon atoms, greater than 12 carbon atoms, greater than 13 carbon atoms, or greater than 14 carbon atoms. In terms of upper limits, the fatty acid may comprise less than 24 carbon atoms, e.g., less than 23 carbon atoms, less than 22 carbon atoms, less than 21 carbon atoms, or less than 20 carbon atoms.

The organic structure of the fatty acid is not particularly limited. In some embodiments, the aliphatic chain of the fatty acid may be saturated. In other embodiments, the aliphatic chain of the fatty acid may be unsaturated. In some embodiments, the fatty acid may be mono-unsaturated or poly-unsaturated, e.g., as a cumulated diene, conjugated diene, or unconjugated diene. In some embodiments, the fatty acid may be comprise an open-chain compound, a straight-chain compound, a branched-chain compound, a cyclic compound, or a combination of these.

Said another way, in some embodiments, the fatty acid of the present disclosure has the following chemical formula:

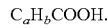

$C_aH_b\text{COOH}.$

In one embodiment, a in the chemical formula is from 8 to 24, e.g., from 9 to 24, from 10 to 24, from 11 to 24, from 12 to 24, from 13 to 24, from 14 to 24, from 8 to 23, from 9 to 23, from 10 to 23, from 11 to 23, from 12 to 23, from 13 to 23, from 14 to 23, from 8 to 22, from 9 to 22, from 10 to 22, from 11 to 22, from 12 to 22, from 13 to 22, from 14 to 22, from 8 to 21, from 9 to 21, from 10 to 21, from 11 to 21, from 12 to 21, from 13 to 21, from 14 to 21, from 8 to 20, from 9 to 20, from 10 to 20, from 11 to 20, from 12 to 20, from 13 to 20, or from 14 to 20. In terms of lower limits, a may be greater than 8, e.g., greater than 9, greater than 10, greater than 11, greater than 12, greater than 13, or greater than 14. In terms of upper limits, a may be less than 24, e.g., less than 23, less than 22, less than 21, or less than 20.

In one embodiment, b in the chemical formula is from 7 to 49, e.g., from 9 to 49, from 11 to 49, from 13 to 47, from 15 to 47, from 7 to 47, from 9 to 47, from 11 to 47, from 13 to 47, from 15 to 47, from 7 to 45, from 9 to 45, from 11 to 45, from 13 to 45, from 15 to 45, from 7 to 43, from 9 to 43, from 11 to 43, from 13 to 43, from 15 to 43, from 7 to 41, from 9 to 41, from 11 to 41, from 13 to 41, from 15 to 41, from 7 to 39, from 9 to 39, from 11 to 39, from 13 to 39, from 15 to 39, from 7 to 37, from 9 to 37, from 11 to 37, from 13 to 37, or from 15 to 37. In terms of upper limits, b may be 49 or less, e.g., 47 or less, 45 or less, 43 or less, 41 or less, 39 or less, or 37 or less. In terms of lower limits, y may be at least 7, e.g., at least 9, at least 11, at least 13, or at least 15.

The fatty acid of the corrosion inhibitor composition is not particularly limited, and any fatty acid that satisfies the above can be used according to the present disclosure. Examples of suitable fatty acids include, without limitation, palmitic acid, oleic acid, linoleic acid, conjugated linoleic acid, abietic acid, stearic acid, linolenic acid, stearidonic acid, nonadecylic acid, arachidic acid, heneicosylic acid, sapienic acid, palmitoleic acid, myristoleic acid, elaidic acid, vaccenic acid, isomers thereof, and combinations thereof.

As noted, in some embodiments of the corrosion inhibitor composition, the fatty acid comprises a mixture of fatty acids. In some embodiments, for example, the fatty acid may comprise a mixture of palmitic acid, oleic acid, and linoleic acid.

In some embodiments, the fatty acid of the corrosion inhibitor composition may comprise a mixture of fatty acids from a tall oil. A tall oil, also known as liquid rosin, typically refers to a by-product of the Kraft process of wood pulp manufacture. The composition of tall oil varies with the type of wood from which it was produced. The typical composition of tall oil includes rosin, resin acids, fatty acids, fatty alcohols, and sterols. By fractional distillation, the rosin content of the tall oil can be reduced to obtain a tall oil fatty acid. Tall oil fatty acid typically comprises a mixture of fatty acids, including oleic acid and abietic acid. The fatty acid of the corrosion inhibitor composition may comprise a tall oil fatty acid.

One example of a commercially available tall oil fatty acid suitable for the corrosion inhibitor composition is SYLFAT™ FA1 by Kraton Corp.

Condensation Reaction; Condensation Product

As noted above, the corrosion inhibitor composition comprises the aforementioned condensation products. In some embodiments, the condensation product is an amide formed by a condensation reaction between a primary amine of the trifunctional amine and an acid group of the fatty acid. By way of non-limiting example, in embodiments where the trifunctional amine comprises triaminononane and the fatty acid comprises palmitic acid, the condensation product may comprise an amide with the following structure:

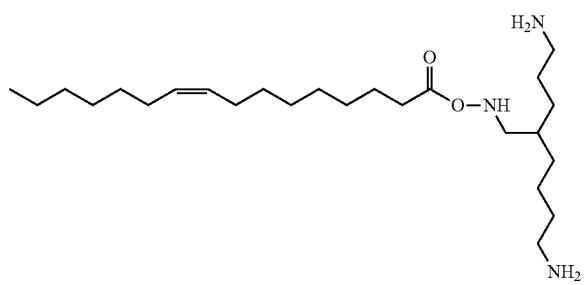 [SMILES: CCCCCC/C=C\CCCCCCCC(=O)ONCC(CCCN)CCCCN]

The present inventors have found that the corrosion rate of the corrosion inhibitor composition is affected by the weight ratio of the trifunctional amine and the fatty acid in the condensation product. In particular, the present inventors have surprisingly found that the corrosion rate can be desirably reduced by producing the condensation product with a specific weight ratio of the trifunctional amine to the fatty acid. In one embodiment, the weight ratio of the trifunctional amine to the fatty acid is from 0.1:1 to 10:1, e.g., from 0.2:1 to 10:1, from 0.3:1 to 10:1, from 0.4:1 to 10:1, from 0.5:1 to 10:1, from 0.1:1 to 8:1, from 0.2:1 to 8:1, from 0.3:1 to 8:1, from 0.4:1 to 8:1, from 0.5:1 to 8:1, from 0.1:1 to 6:1, from 0.2:1 to 6:1, from 0.3:1 to 6:1, from 0.4:1 to 6:1, from 0.5:1 to 6:1, from 0.1:1 to 4:1, from 0.2:1 to 4:1, from 0.3:1 to 4:1, from 0.4:1 to 4:1, from 0.5:1 to 4:1, from 0.1:1 to 2:1, from 0.2:1 to 2:1, from 0.3:1 to 2:1, from 0.4:1 to 2:1, from 0.5:1 to 2:1, from 0.1:1 to 1.5:1, from 0.2:1 to 1.5:1, from 0.3:1 to 1.5:1, from 0.4:1 to 1.5:1, or from 0.5:1 to 1.5:1. In terms of lower limits, the weight ratio of the trifunctional amine to the fatty acid may be greater than 0.1:1, e.g., greater than 0.2:1, greater than 0.3:1, greater than 0.4:1, or greater than 0.5:1. In terms of upper limits, the weight ratio of the trifunctional amine to the fatty acid may be less than 10:1, e.g., less than 8:1, less than 6:1, less than 4:1, less than 2:1, or less than 1.5:1.

In the production of conventional corrosion inhibitors, synthesis may require forming intermediate products that are more highly reactive. For example, in some conventional corrosion inhibitor syntheses, a fatty acid is first converted to a more reactive acid halide. The acid halide then reacts with a conventional amine, such as DETA. This two-step synthetic pathway is undesirable, because it is inefficient. Furthermore, hazardous reagents, such as thionyl chloride, are often used to produce the acid halide. The use of hazardous reagents renders the production of conventional corrosion inhibitors dangerous, and the presence of hazardous reagents in the condensation product, even in small amounts, limits the usefulness of the ultimate corrosion inhibitor.

The present inventors have therefore developed a synthetic pathway for producing the condensation product of the present disclosure without the use of hazardous reagents. In some embodiments, the condensation reaction is carried out by combining the trifunctional amine and the fatty acid and heating the mixture. In some embodiments, e.g., lab-sized synthesis operations, the mixture may be heated using standard laboratory equipment, such as a Bunsen burner, a steam bath, an electric heating mantle, or an electric hot plate. In these embodiments, the mixture may be heated under reflux using methods known to those of skill in the art.

In one embodiment, the condensation reaction comprises heating the trifunctional amine and the fatty acid to a temperature of at least 100° C., e.g., at least 105° C., at least 110° C., at least 115° C., at least 120° C., or at least 125° C. In terms of upper limits, the condensation reaction may comprise heating the reaction mixture to a temperature of less than 300° C., e.g., less than 275° C., less than 250° C., less than 225° C., less than 200° C., or less than 175° C. In terms of ranges, the condensation reaction may comprise heating the reaction mixture to a temperature from 100° C. to 300° C., e.g., from 110° C. to 300° C., from 115° C. to 300° C., from 120° C. to 300° C., from 125° C. to 300° C., from 100° C. to 275° C., from 110° C. to 275° C., from 115° C. to 275° C., from 120° C. to 275° C., from 125° C. to 275° C., from 100° C. to 250° C., from 110° C. to 250° C., from 115° C. to 250° C., from 120° C. to 250° C., from 125° C. to 250° C., from 100° C. to 225° C., from 110° C. to 225° C., from 115° C. to 225° C., from 120° C. to 225° C., from 125° C. to 225° C., from 100° C. to 200° C., from 110° C. to 200° C., from 115° C. to 200° C., from 120° C. to 200° C., from 125° C. to 200° C., from 100° C. to 175° C., from 110° C. to 175° C., from 115° C. to 175° C., from 120° C. to 175° C., or from 125° C. to 175° C.

In one embodiment, the condensation reaction comprises heating the trifunctional amine and the fatty acid for at least 10 hours, e.g., at least 12 hours, at least 14 hours, at least 16 hours, at least 18 hours, or at least 20. In terms of upper limits, the condensation reaction may comprise heating the reaction mixture for less than 50 hours, e.g., less than 45 hours, less than 40 hours, less than 35 hours, less than 30 hours, or less than 25 hours. In terms of ranges, the condensation reaction may comprise heating the reaction mixture for from 10 to 50 hours, e.g., from 12 to 50 hours, from 14 to 50 hours, from 16 to 50 hours, from 18 to 50 hours, from 20 to 50 hours, from 10 to 45 hours, from 12 to 45 hours, from 14 to 45 hours, from 16 to 45 hours, from 18 to 45 hours, from 20 to 45 hours, from 10 to 40 hours, from 12 to 40 hours, from 14 to 40 hours, from 16 to 40 hours, from 18 to 40 hours, from 20 to 40 hours, from 10 to 35 hours, from 12 to 35 hours, from 14 to 35 hours, from 16 to 35 hours, from 18 to 35 hours, from 20 to 35 hours, from 10 to 30 hours, from 12 to 30 hours, from 14 to 30 hours, from 16 to 30 hours, from 18 to 30 hours, from 20 to 30 hours, from 10 to 25 hours, from 12 to 25 hours, from 14 to 25 hours, from 16 to 25 hours, from 18 to 25 hours, or from 20 to 25 hours.

In some embodiments, operating the condensation reaction as described above produces a condensation product comprising less than 15 wt. % impurities, e.g., less than 14 wt. %, less than 13 wt. %, less than 12 wt. %, less than 11 wt. %, or less than 10 wt. %.

In some cases, the progress of the condensation reaction and/or the purity of the condensation product can be measured spectroscopically. In some embodiments, the progress and/or purity is measured by $^1$H NMR spectroscopy. In these embodiments, a sample of the reaction mixture and/or condensation product may be diluted in a deuterated solvent, such as deuterated water, deuterated acetone, deuterated methanol, deuterated dimethyl sulfoxide (DMSO), or deuterated chloroform. In preferred embodiments, the sample is diluted in deuterated DMSO. As shown in FIG. 1, the progress and/or purity can be assessed by the disappearance of a peak representing a carboxylic acid proton (approximately 12 ppm) and the appearance of a peak representing an amide proton (approximately 7 ppm).

The progress of the condensation reaction and/or the purity of the condensation product may also be measured by other spectroscopic or spectrometric methods. For example, the progress and/or purity may be measured by infrared spectroscopy, Raman spectroscopy, GC-MS, LC-MS, HPLC, and other conventional methods known to those of skill in the art.

In some embodiments, the condensation reaction occurs during use of the corrosion inhibitor composition. For example, the condensation product can be formed in situ. Because the condensation reaction comprises heating the trifunctional amine and the fatty acid and does not require additional reagents, the condensation reaction can be carried out in any high-temperature environment. In some embodiments, the trifunctional amine and the fatty acid may be applied to a high-temperature metallic substrate.

In some embodiments, for example, the trifunctional amine and the fatty acid may be pumped into a subterranean formation or wellbore, and the condensation product may form in the subterranean formation. In the subterranean formation or wellbore, one or more metallic substrates may be exposed to high temperatures. The metallic substrate may be exposed to temperature high enough to drive the condensation reaction. In one embodiment, the metallic substrate is exposed to temperatures of at least 100° C., e.g., at least 105° C., at least 110° C., at least 115° C., at least 120° C., or at least 125° C.

Additives

Corrosion inhibitors known in the art typically comprise further additives. For example, some conventional corrosion inhibitors comprise a formic acid additive. The formic acid additive is known in the art to improve the anti-corrosive effect of conventional corrosion inhibitors. The present inventors have found, however, that formic acid is unsuitable for the corrosion inhibitor compositions of the present disclosure. Without being bound by theory, the present inventors believe that formic acid reacts with the trifunctional amine to produce a formamide, which negatively impacts the anti-corrosive effect. Thus, formic acid is not a desirable additive, and some embodiments of the corrosion inhibitor composition of the present invention are substantially free of formic acid.

In one embodiment, the corrosion inhibitor composition comprises less than 10 wt. % formic acid, e.g., less than 8 wt. %, less than 6 wt. %, less than 4 wt. %, or less than 2 wt. %. In terms of lower limits, the corrosion inhibitor composition may comprise greater than 0 wt. % formic acid, e.g., greater than 0.001 wt. %, greater than 0.005 wt. %, greater than 0.01 wt. %, or greater than 0.05 wt. %. In terms of ranges, the corrosion inhibitor composition may comprise from 0 wt. % to 10 wt. % formic acid, e.g., from 0 wt. % to 8 wt. %, from 0 wt. % to 6 wt. %, from 0 wt. % to 4 wt. %, from 0 wt. % to 2 wt. %, from 0.001 wt. % to 10 wt. %, from 0.001 wt. % to 8 wt. %, from 0.001 wt. % to 6 wt. %, from 0.001 wt. % to 4 wt. %, from 0.001 wt. % to 2 wt. %, from 0.005 wt. % to 10 wt. %, from 0.005 wt. % to 8 wt. %, from 0.005 wt. % to 6 wt. %, from 0.005 wt. % to 4 wt. %, from 0.005 wt. % to 2 wt. %, from 0.01 wt. % to 10 wt. %, from 0.01 wt. % to 8 wt. %, from 0.01 wt. % to 6 wt. %, from 0.01 wt. % to 4 wt. %, from 0.01 wt. % to 2 wt. %, from 0.05 wt. % to 10 wt. %, from 0.05 wt. % to 8 wt. %, from 0.05 wt. % to 6 wt. %, from 0.05 wt. % to 4 wt. %, or from 0.05 wt. % to 2 wt. %.

In light of this, the present inventors have discovered additive packages that synergistically improve the anti-corrosive effects of the corrosion inhibitor compositions. Thus, in some embodiments, the corrosion inhibitor composition further comprises one or more additives.

In some embodiments, the corrosion inhibitor further comprises a metal halide and/or halide ion. The present inventors have found that the addition of a metal halide and/or a halide ion surprisingly improves the anti-corrosive effect, e.g., by beneficially reacting with a metallic substrate.

The halide ion used as an additive in the corrosion inhibitor composition is not particularly limited, and any halide may be used. For example, the halide ion may comprise a fluoride ion, a chloride ion, a bromide ion, or an iodide ion, or combinations thereof. The halide ion may be added to the corrosion inhibitor composition as a salt.

The metal halide used as an additive in the corrosion inhibitor composition is also not particularly limited. In some embodiments, the metal halide comprises a halide of an alkali metal. For example, the metal halide may comprise lithium fluoride, lithium chloride, lithium bromide, lithium iodide, sodium fluoride, sodium chloride, sodium bromide, sodium iodide, potassium fluoride, potassium chloride, potassium bromide, potassium iodide, or combinations thereof.

In some embodiments, the metal halide comprises a halide of an alkaline earth metal. For example, the metal halide may comprise beryllium fluoride, beryllium chloride, beryllium bromide, beryllium iodide, magnesium fluoride, magnesium chloride, magnesium bromide, magnesium iodide, calcium fluoride, calcium chloride, calcium bromide, calcium iodide, or combinations thereof.

In some embodiments, the metal halide may comprise a combination of halides of alkali metals and halide of alkaline earth metals.

In one embodiment, the corrosion inhibitor composition comprises the metal halide and/or halide ion in an amount ranging from 0.01 to 25 wt. %, e.g., from 0.02 wt. % to 25 wt. %, from 0.03 wt. % to 25 wt. %, from 0.05 wt. % to 25 wt. %, from 0.08 wt. % to 25 wt. %, from 0.1 wt. % to 25 wt. %, from 0.01 to 20 wt. %, from 0.02 wt. % to 20 wt. %, from 0.03 wt. % to 20 wt. %, from 0.05 wt. % to 20 wt. %, from 0.08 wt. % to 20 wt. %, from 0.1 wt. % to 20 wt. %, from 0.01 to 15 wt. %, from 0.02 wt. % to 15 wt. %, from 0.03 wt. % to 15 wt. %, from 0.05 wt. % to 15 wt. %, from 0.08 wt. % to 15 wt. %, from 0.1 wt. % to 15 wt. %, from 0.01 to 10 wt. %, from 0.02 wt. % to 10 wt. %, from 0.03 wt. % to 10 wt. %, from 0.05 wt. % to 10 wt. %, from 0.08 wt. % to 10 wt. %, from 0.1 wt. % to 10 wt. %, from 0.01 to 5 wt. %, from 0.02 wt. % to 5 wt. %, from 0.03 wt. % to 5 wt. %, from 0.05 wt. % to 5 wt. %, from 0.08 wt. % to 5 wt. %, or from 0.1 wt. % to 5 wt. %. In terms of upper limits, the corrosion inhibitor composition may comprise less than 25 wt. % metal halide and/or halide ion, e.g., less than 20 wt. %, less than 15 wt. % less than 10 wt. % or less than 5 wt. %. In terms of lower limits, the corrosion inhibitor may comprise greater than 0.01 wt. % metal halide and/or halide ion, e.g., greater than 0.02 wt. %, greater than 0.03 wt. %, greater than 0.05 wt. %, greater than 0.08 wt. %, or greater than 0.1 wt. %.

In some embodiments, the corrosion inhibitor composition further comprises an additional trifunctional amine. Any trifunctional amine described above with respect to the condensation product may be used as an additive. Without being bound by theory, the inventors believe that the addition of a trifunctional amine additive may improve the anti-corrosive effect by suppressing the hydrolysis of the condensation product at high temperatures.

In some embodiments, the additional trifunctional amine is the same as the reactant trifunctional amine. That is to say, in some embodiments, the trifunctional amine used as an additive has the same or substantially similar structure as the trifunctional amine used in the condensation reaction to form the condensation product.

In some embodiments, the trifunctional amine is different from the reactant trifunctional amine. That is to say, in some embodiments, the trifunctional amine used as an additive has a substantially different structure from the trifunctional used in the condensation reaction to form the condensation product.

In some embodiments, the additional trifunctional amine comprises a combination of two or more trifunctional amines. The additional trifunctional amine may comprise, for example, a combination of the reactant trifunctional amine with other trifunctional amines.

In one embodiment, the corrosion inhibitor composition comprises the (additional) trifunctional amine in an amount ranging from 0.01 to 25 wt. %, e.g., from 0.1 wt. % to 25 wt. %, from 0.5 wt. % to 25 wt. %, from 1 wt. % to 25 wt. %, from 2 wt. % to 25 wt. %, from 5 wt. % to 25 wt. %, from 0.01 to 20 wt. %, from 0.1 wt. % to 20 wt. %, from 0.5 wt. % to 20 wt. %, from 1 wt. % to 20 wt. %, from 2 wt. % to 20 wt. %, from 5 wt. % to 20 wt. %, from 0.01 to 15 wt. %, from 0.1 wt. % to 15 wt. %, from 0.5 wt. % to 15 wt. %, from 1 wt. % to 15 wt. %, from 2 wt. % to 15 wt. %, from 5 wt. % to 15 wt. %, from 0.01 to 10 wt. %, from 0.1 wt. % to 10 wt. %, from 0.5 wt. % to 10 wt. %, from 1 wt. % to 10 wt. %, from 2 wt. % to 10 wt. %, or from 5 wt. % to 10 wt. %. In terms of upper limits, the corrosion inhibitor composition may comprise less than 25 wt. % trifunctional amine, e.g., less than 20 wt. %, less than 15 wt. %, or less than 10 wt. %. In terms of lower limits, the corrosion inhibitor may comprise greater than 0.01 wt. % trifunctional amine, e.g., greater than 0.1 wt. %, greater than 0.5 wt. %, greater than 1 wt. %, greater than 2 wt. %, or greater than 5 wt. %.

In some embodiments, the corrosion inhibitor composition further comprises an additional fatty acid. Any fatty acid described above with respect to the condensation product may be used as an additive. The present inventors conjecture that the addition of a fatty acid additive may improve the anti-corrosive effect by suppressing the hydrolysis of the condensation product at high temperatures.

In some embodiments, the additional fatty acid is the same as the reactant fatty acid. That is to say, in some embodiments, the fatty acid used as an additive has the same or substantially similar structure as the fatty acid used in the condensation reaction to form the condensation product.

In some embodiments, the fatty acid is different from the reactant fatty acid. That is to say, in some embodiments, the fatty acid used as an additive has a substantially different structure from the trifunctional used in the condensation reaction to form the condensation product.

In some embodiments, the additional fatty acid comprises a combination of two or more fatty acids. The additional fatty acid may comprise, for example, a combination of the reactant fatty acid with other fatty acids.

In one embodiment, the corrosion inhibitor composition comprises the (additional) fatty acid in an amount ranging from 0.01 to 25 wt. %, e.g., from 0.1 wt. % to 25 wt. %, from 0.5 wt. % to 25 wt. %, from 1 wt. % to 25 wt. %, from 2 wt. % to 25 wt. %, from 5 wt. % to 25 wt. %, from 0.01 to 20 wt. %, from 0.1 wt. % to 20 wt. %, from 0.5 wt. % to 20 wt. %, from 1 wt. % to 20 wt. %, from 2 wt. % to 20 wt. %, from 5 wt. % to 20 wt. %, from 0.01 to 15 wt. %, from 0.1 wt. % to 15 wt. %, from 0.5 wt. % to 15 wt. %, from 1 wt. % to 15 wt. %, from 2 wt. % to 15 wt. %, from 5 wt. % to 15 wt. %, from 0.01 to 10 wt. %, from 0.1 wt. % to 10 wt. %, from 0.5 wt. % to 10 wt. %, from 1 wt. % to 10 wt. %, from 2 wt. % to 10 wt. %, or from 5 wt. % to 10 wt. %. In terms of upper limits, the corrosion inhibitor composition may comprise less than 25 wt. % fatty acid, e.g., less than 20 wt. %, less than 15 wt. %, or less than 10 wt. %. In terms of lower limits, the corrosion inhibitor may comprise greater than 0.01 wt. % fatty acid, e.g., greater than 0.1 wt. %, greater than 0.5 wt. %, greater than 1 wt. %, greater than 2 wt. %, or greater than 5 wt. %.

Corrosion Inhibition; Corrosion Rate

The anti-corrosive effect of the corrosion inhibitor compositions described herein can be measured via ASTM G31-12a, which is incorporated herein by reference. ASTM G31-12a (2017) describes the standard immersion corrosion testing of metals. In particular, ASTM G31-12a defines a standardized procedure for assessing the corrosion rate of a metallic substrate. ASTM G31-12a specifies apparatus, sampling, test conditions (temperature, gas sparging, fluid motion, solution volume, duration of testing), preparation of metallic substrates for analysis, interpretation of results, and calculation of the rate of acid corrosion.

As noted above, the rate of acid corrosion of a given metal varies directly with the temperature of the acid. That is to say, a given acid typically corrodes a given more aggressively or rapidly as temperature increases. Furthermore, at higher temperatures, conventional anti-corrosives prove ineffective at mitigating corrosion. The present inventors have found, however, that the corrosion inhibitor composition does effectively inhibit acid corrosion, even at higher temperatures.

In some embodiments, the corrosion inhibitor composition demonstrates a corrosion rate of less than 0.01 $lb/ft^2$ in 6 hours when measured according to ASTM G31-12a at 78° F., e.g., less than 0.009 $lb/ft^2$ in 6 hours, less than 0.005 $lb/ft^2$ in 6 hours, less than 0.001 $lb/ft^2$ in 6 hours, less than 0.0009 $lb/ft^2$ in 6 hours, less than 0.0005 $lb/ft^2$ in 6 hours, less than 0.0001 $lb/ft^2$ in 6 hours, less than 0.00009 $lb/ft^2$ in 6 hours, less than 0.00005 $lb/ft^2$ in 6 hours, or less than 0.00001 $lb/ft^2$ in 6 hours.

In some embodiments, the corrosion inhibitor composition demonstrates a corrosion rate of less than 0.1 $lb/ft^2$ in 6 hours when measured according to ASTM G31-12a at 200° F., e.g., less than 0.09 $lb/ft^2$ in 6 hours, less than 0.08 $lb/ft^2$ in 6 hours, less than 0.06 $lb/ft^2$ in 6 hours, less than 0.05 $lb/ft^2$ in 6 hours, less than 0.03 $lb/ft^2$ in 6 hours, or less than 0.02 $lb/ft^2$ in 6 hours.

In some embodiments, the corrosion inhibitor composition demonstrates a corrosion rate of less than 5 $lb/ft^2$ in 6 hours when measured according to ASTM G31-12a at 300° F., e.g., less than 4 $lb/ft^2$ in 6 hours, less than 3 $lb/ft^2$ in 6 hours, less than 2 $lb/ft^2$ in 6 hours, less than 1 $lb/ft^2$ in 6 hours, less than 0.9 $lb/ft^2$ in 6 hours, less than 0.85 $lb/ft^2$ in 6 hours, or less than 0.8 $lb/ft^2$ in 6 hours.

In one embodiment, the corrosion inhibitor composition comprises a condensation product formed by condensation reacting triaminononane and tall oil fatty acid at a weight ratio from 0.5:1 to 3:1 and demonstrates a corrosion rate less than 0.0001 $lb/ft^2$ in 6 hours at 78° F.

In one embodiment, the corrosion inhibitor composition comprises a condensation product formed by condensation reacting triaminononane and tall oil fatty acid at a weight ratio from 0.5:1 to 3:1 and demonstrates a corrosion rate less than 0.08 $lb/ft^2$ in 6 hours at 200° F.

In one embodiment, the corrosion inhibitor composition comprises a condensation product formed by condensation reacting triaminononane and tall oil fatty acid at a weight ratio from 0.5:1 to 3:1, further comprises from 0.05 wt. % to 5 wt. % a potassium iodide additive, and demonstrates a corrosion rate less than 0.0001 $lb/ft^2$ in 6 hours at 78° F.

In one embodiment, the corrosion inhibitor composition comprises a condensation product formed by condensation reacting triaminononane and tall oil fatty acid at a weight ratio from 0.5:1 to 3:1, further comprises from 0.05 wt. % to 5 wt. % a potassium iodide additive, and demonstrates a corrosion rate less than 0.05 lb/ft$^2$ in 6 hours at 200° F.

In one embodiment, the corrosion inhibitor composition comprises a condensation product formed by condensation reacting triaminononane and tall oil fatty acid at a weight ratio from 0.5:1 to 3:1, further comprises from 0.05 wt. % to 5 wt. % a potassium iodide additive, and demonstrates a corrosion rate less than 1 lb/ft$^2$ in 6 hours at 300° F.

In one embodiment, the corrosion inhibitor composition comprises a condensation product formed by condensation reacting triaminononane and tall oil fatty acid at a weight ratio from 0.5:1 to 3:1, further comprises from 0.05 wt. % to 5 wt. % a potassium iodide additive, from 5 wt. % to 10 wt. % additional triaminononane, and from 5 wt. % to 10 wt. % additional tall oil fatty acid, and demonstrates a corrosion rate less than 0.03 lb/ft$^2$ in 6 hours at 200° F.

Use of Corrosion Inhibitor Composition

The present disclosure also relates to methods of inhibiting the corrosion of a metallic substrate by the use of the corrosion inhibitor compositions described herein.

The corrosion inhibitor compositions described herein are broadly useful for reducing the corrosion rate of a variety of metallic substrates. Thus, the structure and material of the metallic substrate to which the corrosion inhibitor composition is applied is not particularly limited. For example, the metallic substrate may be an alloy comprising carbon (e.g., steel), silicon, aluminum, titanium, vanadium, chromium, manganese, cobalt, nickel, copper, zinc, molybdenum, or combinations thereof.

In some embodiments, applying the corrosion inhibitor composition comprises dispersing the corrosion inhibitor composition in an organic solvent. In some embodiments, for example, the corrosion inhibitor composition is dissolved or diluted in the organic solvent so as to facilitate application of the corrosion inhibitor composition to the metallic substrate. The composition of the organic solvent in which the corrosion inhibitor composition is dispersed is not particularly limited, and those of skill in the art will understand which solvents are well-suited to the corrosion inhibitor composition. The organic solvent may be, for example, a polar protic solvent, a polar aprotic solvent, or a nonpolar solvent.

In some embodiments, the organic solvent is an alcohol. For example, the organic solvent may comprise ethanol, n-propanol, isopropanol, n-butanol, sec-butanol, isobutanol, t-butanol, amyl alcohol, and combinations thereof.

The amount of organic solvent used to dissolve the condensation product is not particularly limited and may vary with the intended use of the corrosion inhibitor composition. In one embodiment, the condensation product is dissolved or diluted in sufficient organic solvent to produce a solution of from 2 vol. % to 40 vol. % condensation product, e.g., from 2 vol. % to 40 vol. %, e.g., from 2 vol. % to 35 vol. %, from 2 vol. % to 30 vol. %, from 2 vol. % to 25 vol. %, from 2 vol. % to 20 vol. %, from 4 vol. % to 40 vol. %, from 4 vol. % to 40 vol. %, e.g., from 4 vol. % to 35 vol. %, from 4 vol. % to 30 vol. %, from 4 vol. % to 25 vol. %, from 4 vol. % to 20 vol. %, from 6 vol. % to 40 vol. %, from 6 vol. % to 40 vol. %, e.g., from 6 vol. % to 35 vol. %, from 6 vol. % to 30 vol. %, from 6 vol. % to 25 vol. %, from 6 vol. % to 20 vol. %, from 8 vol. % to 40 vol. %, from 8 vol. % to 40 vol. %, e.g., from 8 vol. % to 35 vol. %, from 8 vol. % to 30 vol. %, from 8 vol. % to 25 vol. %, from 8 vol. % to 20 vol. %, from 10 vol. % to 40 vol. %, from 10 vol. % to 40 vol. %, e.g., from 10 vol. % to 35 vol. %, from 10 vol. % to 30 vol. %, from 10 vol. % to 25 vol. %, or from 10 vol. % to 20 vol. %. In terms of lower limits, the condensation product may be dissolved or diluted to less than 40 vol. %, e.g., less than 35 vol. %, less than 30 vol. %, less than 25 vol. %, or less than 20 vol. %. In terms of lower limits, the condensation product may be dissolved or diluted to greater than 2 vol. %., e.g., greater than 4 vol. %, greater than 6 vol. %, or greater than 10 vol. %.

The corrosion inhibitor compositions may be used, for example, to prevent heat or acid corrosion in subterranean formations or wellbores. In this application, the corrosion inhibitor composition may be pumped into the wellbore. The corrosion inhibitor composition may be pumped into the wellbore alone or in combination with other conventional production chemicals, e.g., scale inhibitors or biocides.

EXAMPLES

The present disclosure will be better understood in view of the following non-limiting examples.

Example 1

Corrosion inhibitor compositions comprising a condensation product of triaminononane (TAN) and tall oil fatty acid (TOFA) were prepared. The condensation product was prepared with varying weight ratios of TAN to TOFA. In each instance, the condensation reaction was carried out by refluxing at 150° C. for at least 12 hours. Approximately 7 grams of each condensation product was diluted in approximately 35 mL isopropanol.

The anti-corrosive effect of the corrosion inhibitor composition was measured, according to ASTM G31-12a, by diluting the corrosion inhibitor in an aqueous hydrochloric acid solution (15 vol. % HCl) to 1 wt. % corrosion inhibitor composition. Corrosion was measured at varying temperatures on coupons of a steel alloy (L80 from ALSPI). Results are shown in Table 1, below:

TABLE 1

Corrosion Testing of TAN-TOFA Condensation Product

| | Weight Ratio (TAN:TOFA) | Temperature (° F.) | Corrosion Rate (lb/ft$^2$ in 6 hours) |
|---|---|---|---|
| Ex. 1a | 1:1 | 78 | 0.00001 |
| Ex. 1b | 1:1 | 200 | 0.0788 |
| Ex. 1c | 1:2 | 78 | 0.00001 |
| Ex. 1d | 1:3 | 78 | 0.00001 |

As shown in Table 1, the corrosion inhibitor compositions of Examples 1a-d demonstrated low corrosion rates at temperatures up to 200° F. Furthermore, Examples 1a, 1c, and 1d demonstrated that the condensation product inhibits corrosion at varying weight ratios.

Example 2

A condensation product of TAN and TOFA was prepared, as described above, using a 1:1 weight ratio of TAN to TOFA. Additives were combined with the condensation product to form corrosion inhibitor compositions. The additives comprised formic acid, potassium iodide, (additional) TAN, and/or (additional) TOFA, as shown in Table 2, below.

The anti-corrosive effect of the corrosion inhibitor compositions was measured, according to ASTM G31-12a, by diluting the corrosion inhibitor in an aqueous hydrochloric acid solution (15 vol. % HCl) to 1 wt. % corrosion inhibitor composition. Corrosion was measured at varying temperatures on coupons of a steel alloy (L80 from ALSPI). Results are shown in Table 2, below:

TABLE 2

Corrosion Testing of 1:1 TAN to TOFA plus Additives on L80

| | Additive | Temperature (° F.) | Corrosion Rate (lb/ft² in 6 hours) |
|---|---|---|---|
| Comp. A | Formic acid (2.5 wt. %) | 300 | Coupon disappeared |
| Ex. 2a | KI (0.1 wt. %) | 200 | 0.0382 |
| Ex. 2b | KI (2.5 wt. %) | 200 | 0.016 |
| Ex. 2c | KI (2.5 wt. %) | 300 | 0.856 |
| Ex. 2d | KI (2.5 wt. %) TAN (1 wt. %) TOFA (1 wt. %) | 200 | 0.015 |
| Ex. 2e | KI (2.5 wt. %) TAN (7 wt. %) TOFA (7 wt. %) | 200 | 0.015 |

As shown in Table 2, the corrosion inhibitor compositions of Examples 2a-2e demonstrated low corrosion rates. In particular, these examples showed superior performance at temperatures of 200° F., and even at temperatures of 300° F. In contrast, the corrosion inhibitor composition of Comp. A did not sufficiently inhibit corrosion at higher temperatures.

Example 3

A condensation product of TAN and TOFA was prepared, as described above, using a 1:1 weight ratio of TAN to TOFA. Additives were combined with the condensation product to form corrosion inhibitor compositions. The additives comprised sodium chloride, potassium iodide, (additional) TAN, and/or (additional) TOFA, as shown in Table 3, below.

The anti-corrosive effect of the corrosion inhibitor compositions was measured, according to ASTM G31-12a, by diluting the corrosion inhibitor in an aqueous hydrochloric acid solution (15 vol. % HCl) to 1 wt. % corrosion inhibitor composition. Corrosion was measured at 200° F. on coupons of a chromium alloy (Chrome 13 from ALSPI). Results are shown in Table 3, below:

TABLE 3

Corrosion Testing of 1:1 TAN to TOFA plus Additives on Chrome 13

| | Additive | Corrosion Rate (lb/ft² in 6 hours) |
|---|---|---|
| Ex. 3a | KI (2.5 wt. %) TAN (1 wt. %) TOFA (1 wt. %) | 0.00051 |
| Ex. 3b | KI (0.1 wt. %) TAN (1 wt. %) TOFA (1 wt. % | 0.053 |

As shown in Table 3, the corrosion inhibitor compositions of Examples 3a-3b demonstrated low corrosion rates, even at a high temperature on a different metal alloy.

Embodiments

The following embodiments are contemplated. All combinations of features and embodiments are contemplated.

Embodiment 1 is a corrosion inhibitor composition, comprising a condensation product of a trifunctional amine and a fatty acid; wherein the weight ratio of the trifunctional amine to the fatty acid in the condensation product ranges from 0.1:1 to 10:1; and wherein the corrosion inhibitor composition demonstrates a corrosion rate less than 0.001 lb/ft² in 6 hours at 78° F. as tested in accordance with ASTM G31-12a (2017).

Embodiment 2 is the corrosion inhibitor composition of embodiment(s) 1, wherein the weight ratio of the trifunctional amine to the fatty acid in the condensation product is from 0.3:1 to 2:1.

Embodiment 3 is the corrosion inhibitor composition of embodiment(s) 1, wherein the corrosion inhibitor composition demonstrates a corrosion rate of less than 0.001 lb/ft² in 6 hours at 78° F.

Embodiment 4 is the corrosion inhibitor composition of embodiment(s) 1, wherein the corrosion inhibitor composition demonstrates a corrosion rate of less than 0.1 lb/ft² in 6 h at 200° F.

Embodiment 5 is the corrosion inhibitor composition of embodiment(s) 1, further comprising a metal halide/halide ion, optionally present in an amount ranging from 0.01 wt. % to 25 wt. %.

Embodiment 6 is the corrosion inhibitor composition of embodiment(s) 5, wherein the corrosion inhibitor composition demonstrates a corrosion rate of less than 0.05 lb/ft² in 6 h at 200° F.

Embodiment 7 is the corrosion inhibitor composition of embodiment(s) 5, wherein the corrosion inhibitor composition demonstrates a corrosion rate of less than 5 lb/ft² in 6 h at 300° F.

Embodiment 8 is the corrosion inhibitor composition of embodiment(s) 1, further comprising an additional trifunctional amine, optionally present in an amount ranging from 0.01 wt. % to 25 wt. %.

9. The corrosion inhibitor composition of embodiment(s) 1, further comprising an additional fatty acid, optionally present in an amount ranging from 0.01 wt. % to 25 wt. %.

Embodiment 10 is the corrosion inhibitor composition of embodiment(s) 8, wherein the additional trifunctional amine is the same as the reactant trifunctional amine.

Embodiment 11 is the corrosion inhibitor composition of embodiment(s) 9, wherein the additional fatty acid amine is the same as the reactant fatty acid.

Embodiment 12 is the corrosion inhibitor composition of embodiment(s) 1, further comprising: a first additive comprising a metal halide/halide ion; a second additive comprising an additional trifunctional amine; and a third additive comprising an additional fatty acid.

Embodiment 13 is the corrosion inhibitor composition of embodiment(s) 12, wherein the wherein the corrosion inhibitor composition demonstrates a corrosion rate of less than 0.02 lb/ft² in 6 h at 200° F.

Embodiment 14 is the corrosion inhibitor composition of embodiment(s) 1, wherein the trifunctional amine comprises from 6 to 12 carbon atoms.

Embodiment 15 is the corrosion inhibitor composition of embodiment(s) 1, wherein the trifunctional amine has a chemical formula $C_xH_y(NH_2)_3$, wherein x is from 6 to 12; and wherein y is less than or equal to 23.

Embodiment 16 is the corrosion inhibitor composition of embodiment(s) 1, wherein the fatty acid comprises palmitic acid, oleic acid, linoleic acid, abietic acid, sapienic acid, palmitoleic acid, myristoleic acid, elaidic acid, vaccenic acid, or tall oil, isomers thereof, or combinations thereof.

Embodiment 17 is the corrosion inhibitor composition of embodiment(s) 1, wherein the halide/halide ion comprises lithium chloride, sodium chloride, potassium chloride, lithium bromide, sodium bromide, potassium bromide, lithium iodide, sodium iodide, or potassium iodide, or combinations thereof.

Embodiment 18 is the corrosion inhibitor composition of embodiment(s) 1, wherein the corrosion inhibitor composition is substantially free of formic acid.

Embodiment 19 is a process for preparing corrosion inhibitor composition, comprising: reacting a trifunctional amine and a fatty acid at a temperature of at least 100° C. for at least 10 hours to form a condensation product; wherein the condensation product comprises less than 15 wt. % impurities.

Embodiment 20 is the process of embodiment(s) 19, wherein the method is substantially free of thionyl chloride.

Embodiment 21 is a process for inhibiting corrosion of a metallic substrate, the method comprising: applying to the metallic substrate a corrosion inhibitor composition comprising a condensation product of a trifunctional amine and a fatty acid; wherein the weight ratio of the trifunctional amine to the fatty acid in the condensation product ranges from 0.1:1 to 10:1.

Embodiment 22 is the process of embodiment(s) 21, wherein the applying further comprises dispersing the corrosion inhibitor composition in an organic solvent.

Embodiment 23 is the process of embodiment(s) 22, wherein the organic solvent is an alcohol selected from the group consisting of ethanol, n-propanol, isopropanol, n-butanol, sec-butanol, isobutanol, t-butanol, amyl alcohol, and combinations thereof.

Embodiment 24 is the process of embodiment(s) 21, wherein the corrosion inhibitor composition further comprises: 0.01 to 25 wt. % a first additive comprising a metal halide/halide ion; 0.01 to 25 wt. % a second additive comprising an additional trifunctional amine; and/or 0.01 to 25 wt. % a third additive comprising an additional fatty acid.

We claim:

1. A corrosion inhibitor composition, comprising
a condensation product of a trifunctional amine and a tall oil fatty acid; wherein the weight ratio of the trifunctional amine to the tall oil fatty acid in the condensation product ranges from 0.5:1 to 3:1; and wherein the trifunctional amine is selected from the group consisting of triaminohexane, triaminoheptane, triaminooctane, triaminononane, triaminodecane, triaminoundecane, triaminododecane, triaminocyclohexane, triaminocycloheptane, triaminocyclooctane, triaminocyclononane, triaminocyclodecane, triaminocycloundecane, triaminocyclododecane, triaminohexene, triaminoheptene, triaminooctene, triaminononene, triaminodecene, triaminoundecene, triaminododecene, tetraaminohexane, tetraaminoheptane, tetraaminooctane, tetraaminononene, tetraaminodecene, tetraaminoundecene, tetraaminododecane, tetraaminocyclohexane, tetraaminocycloheptane, tetraaminocyclooctane, tetraaminocyclononane, tetraaminocyclodecane, tetraaminocycloundecane, tetraaminocyclododecane, tetraaminohexene, tetraaminoheptene, tetraaminooctene, tetraaminononene, tetraaminodecene, tetraaminoundecene, tetraaminododecene, and isomers thereof, or combinations thereof; and
an additive package comprising potassium iodide in an amount ranging from 0.05 wt. % to 5 wt. %;
wherein the corrosion inhibitor composition demonstrates a corrosion rate less than 0.05 lb/ft$^2$ in 6 hours at 200° F.

2. The corrosion inhibitor composition of claim 1, wherein the additive package further comprises an additional trifunctional amine in an amount ranging from 1 wt. % to 25 wt. %.

3. The corrosion inhibitor composition of claim 2, wherein the additional trifunctional amine is the same as the trifunctional amine.

4. The corrosion inhibitor composition of claim 1, wherein the additive package further comprises an additional fatty acid.

5. The corrosion inhibitor composition of claim 4, wherein the additional fatty acid is the same as the tall oil fatty acid.

6. The corrosion inhibitor composition of claim 4, wherein the additional fatty acid comprises palmitic acid, oleic acid, linoleic acid, abietic acid, sapienic acid, palmitoleic acid, myristoleic acid, elaidic acid, vaccenic acid, or tall oil, isomers thereof, or combinations thereof.

7. The corrosion inhibitor composition of claim 1, wherein the additive package further comprises an additional trifunctional amine in an amount ranging from 1 wt. % to 25 wt. % and an additional fatty acid.

8. The corrosion inhibitor composition of claim 1, wherein the corrosion inhibitor composition comprises less than 2 wt % formic acid.

9. The corrosion inhibitor composition of claim 1, wherein the corrosion inhibitor composition demonstrates a corrosion rate of less than 0.0001 lb/ft$^2$ in 6 h at 78° F.

10. A process for preparing a corrosion inhibitor composition, comprising:
reacting a trifunctional amine and a tall oil fatty acid at a temperature of at least 100° C. for at least 10 hours to form a condensation product, wherein the weight ratio of the trifunctional amine to the tall oil fatty acid in the condensation product ranges from 0.5:1 to 3:1, wherein the trifunctional amine is selected from the group consisting of triaminohexane, triaminoheptene, triaminooctane, triaminononane, triaminodecane, triaminoundecane, triaminododecane, triaminocyclohexane, triaminocycloheptane, triaminocyclooctane, triaminocyclononane, triaminocyclodecane, triaminocycloundecane, triaminocyclododecane, triaminohexene, triaminoheptene, triaminooctene, triaminononene, triaminodecene, triaminoundecene, triaminododecene, tetraaminohexane, tetraaminoheptane, tetraaminooctane, tetraaminononane, tetraaminodecene, tetraaminoundecene, tetraaminododecane, tetraaminocyclohexane, tetraaminocycloheptane, tetraaminocyclooctane, tetraaminocyclononane, tetraaminocyclodecane, tetraaminocycloundecane, tetraaminocyclododecane, tetraaminohexene, tetraaminoheptene, tetraaminooctene, tetraaminononene, tetraaminodecene, tetraaminoundecene, tetraaminododecene, and isomers thereof, or combinations thereof; and
adding an additive package comprising potassium iodide in an amount ranging from 0.05 wt. % to 5 wt. %;
wherein the corrosion inhibitor composition demonstrates a corrosion rate less than 0.05 lb/ft$^2$ in 6 hours at 200° F.

11. The process of claim 10, wherein the corrosion inhibitor composition demonstrates a corrosion rate of less than 0.0001 lb/ft$^2$ in 6 h at 78° F.

12. The process of claim 10, wherein the condensation product comprises less than 15 wt % impurities.

13. The process of claim 10, wherein the additive package further comprises an additional trifunctional amine in an amount ranging from 1 wt. % to 25 wt. % and an additional fatty acid.

14. A process for inhibiting corrosion of a metallic substrate, the method comprising:
applying to the metallic substrate a corrosion inhibitor composition comprising
a condensation product of a trifunctional amine and a tall oil fatty acid, wherein the trifunctional amine is selected from the group consisting of triaminohexane, triaminoheptane, triaminooctane, triaminononane, triaminodecane, triaminoundecane, triaminododecane, triaminocyclohexane, triaminocycloheptane, triaminocyclooctane, triaminocyclononane, triaminocyclodecane, triaminocycloundecane, triaminocyclododecane, triaminohexene, triaminoheptene, triaminooctene, triaminononene, triaminodecene, triaminoundecene, triaminododecene, tetraaminohexane, tetraaminoheptane, tetraaminooctane, tetraaminononane, tetraaminodecane, tetraaminoundecane, tetraaminododecane, tetraaminocyclohexane, tetraaminocycloheptane, tetraaminocyclooctane, tetraaminocyclononane, tetraaminocyclodecane, tetraaminocycloundecane, tetraaminocyclododecane, tetraaminohexene, tetraaminoheptene, tetraaminooctene, tetraaminononene, tetraaminodecene, tetraaminoundecene, tetraaminododecene, and isomers thereof, or combinations thereof;
wherein the weight ratio of the trifunctional amine to the fatty acid in the condensation product ranges from 0.5:1 to 3:1; and
an additive package comprising potassium iodide in an amount ranging from 0.05 wt. % to 5 wt. %;
wherein the corrosion inhibitor composition demonstrates a corrosion rate less than 0.05 lb/ft$^2$ in 6 hours at 200° F.

15. The process of claim 14, further comprising an organic solvent, wherein the organic solvent is an alcohol selected from the group consisting of ethanol, n-propanol, isopropanol, n-butanol, sec-butanol, isobutanol, t-butanol, amyl alcohol, and combinations thereof.

16. The process of claim 14, wherein the corrosion inhibitor composition demonstrates a corrosion rate of less than 0.0001 lb/ft$^2$ in 6 h at 78° F.

17. The process of claim 14, wherein the additive package further comprises an additional trifunctional amine in an amount ranging from 1 wt. % to 25 wt. % and an additional fatty acid.

* * * * *